US011453049B2

(12) United States Patent
Dioni et al.

(10) Patent No.: US 11,453,049 B2
(45) Date of Patent: Sep. 27, 2022

(54) INJECTION ASSEMBLY FOR PRESSURE DIE CASTING SYSTEMS

(71) Applicant: IDRA S.R.L., Travagliato (IT)

(72) Inventors: Fiorenzo Dioni, Castelmella (IT); Richard Oberle, Elsenfeld (DE)

(73) Assignee: IDRA S.R.L., Travagliato (IT)

( * ) Notice: Subject to any disclaimer, the term of this patent is extended or adjusted under 35 U.S.C. 154(b) by 0 days.

(21) Appl. No.: 16/468,315

(22) PCT Filed: Dec. 11, 2017

(86) PCT No.: PCT/EP2017/001413
§ 371 (c)(1),
(2) Date: Jun. 11, 2019

(87) PCT Pub. No.: WO2018/108313
PCT Pub. Date: Jun. 21, 2018

(65) Prior Publication Data
US 2020/0078858 A1 Mar. 12, 2020

(30) Foreign Application Priority Data
Dec. 13, 2016 (IT) ........................ 102016000125927

(51) Int. Cl.
*B22D 17/20* (2006.01)
*B22D 17/32* (2006.01)
*B22D 17/22* (2006.01)
*B29C 45/82* (2006.01)

(52) U.S. Cl.
CPC ....... *B22D 17/203* (2013.01); *B22D 17/2046* (2013.01); *B22D 17/22* (2013.01); *B22D 17/32* (2013.01); *B29C 45/82* (2013.01); *B29C 2945/76498* (2013.01)

(58) Field of Classification Search
CPC .. B22D 17/20; B22D 17/203; B22D 17/2046; B22D 17/22; B22D 17/32; B29C 45/82; B29C 2945/76498
USPC ...................................... 164/312, 314, 155.3
See application file for complete search history.

(56) References Cited

U.S. PATENT DOCUMENTS 4,747,576 A * 5/1988 Saito et al. ............. F16K 1/523 251/25
5,662,159 A 9/1997 Iwamoto
2001/0040019 A1* 11/2001 Tsuji ..................... B22D 17/10 164/314
2007/0267166 A1 11/2007 Harada
(Continued)

FOREIGN PATENT DOCUMENTS

DE 19842830 5/1999
EP 2295171 3/2011
(Continued)

*Primary Examiner* — Kevin P Kerns
(74) *Attorney, Agent, or Firm* — Duane Morris LLP; Gregory M. Lefkowitz; Randall C. Pyles

(57) ABSTRACT

An injection assembly, for pressure die casting systems, has an injection cylinder adapted to inject liquid metal into a casting cavity; the injection cylinder is actuated by a hydraulic flow of an oil-pressure controlled circuit; the oil-pressure controlled circuit includes a hydraulic cushion which blocks and releases the flow of the hydraulic fluid in the injection cylinder and provides a counter-pressure of preset value to control the injection speeds and to prevent cavitation in the injection cylinder.

4 Claims, 1 Drawing Sheet

(56) References Cited

U.S. PATENT DOCUMENTS

| | | | | |
|---|---|---|---|---|
| 2011/0247777 | A1 | 10/2011 | Hauser | |
| 2016/0075068 | A1* | 3/2016 | Yamaguchi et al. | B22D 17/32 425/146 |

FOREIGN PATENT DOCUMENTS

| | | | |
|---|---|---|---|
| JP | S51108631 | A | 9/1976 |
| JP | 2010201436 | | 9/2010 |

* cited by examiner

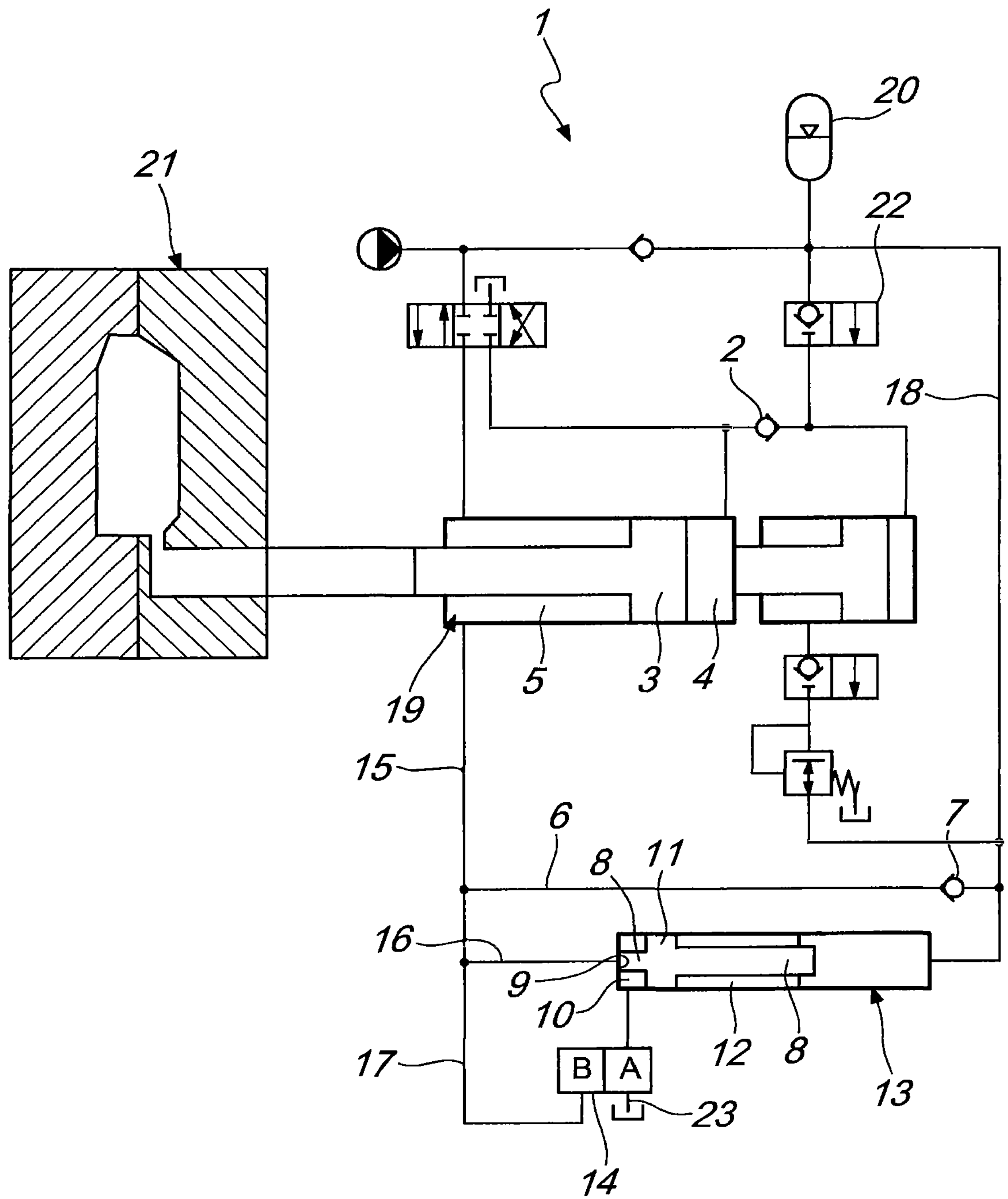
1
20
21
22
2
18
5
3
4
19
15
6
7
8
11
16
9
10
12
8
13
17
B
A
23
14

INJECTION ASSEMBLY FOR PRESSURE DIE CASTING SYSTEMS

CROSS-REFERENCE TO RELATED APPLICATIONS

This application is a § 371 national stage entry of International Application No. PCT/EP2017/001413, filed Dec. 11, 2017, which claims priority of Italian National Application No. 102016000125927, filed Dec. 13, 2016, the entire contents of which are incorporated herein by reference.

BRIEF SUMMARY OF THE INVENTION

The present invention relates to an injection assembly for pressure die casting systems.

As is known, a pressure die casting system has an injection assembly which has the function of filling the casting cavity with the liquid metal.

A conventional injection assembly has an injection cylinder actuated by an oil-pressure controlled circuit.

Current injection systems have the severe problem of cavitation and of the consequent pressure peaks and very high temperatures.

Those phenomena arise when the injection cylinder, after filling the die with the metal with its movement, stops suddenly.

Due to the sudden stop of the injection piston, the column of hydraulic fluid that is pushed out at high speed from the annular chamber of the injection cylinder breaks up, causing the phenomenon of cavitation with consequent forming of pressure peaks and extremely high temperatures (Diesel effect).

The cavitation triggered during the step of injection in the annular branch of the injection cylinder compromises the quality of the cast piece and often entails machine downtime and consequent interruption of production, due to the failure of hydraulic components caused by the presence of pressure peaks and high temperatures caused by cavitation.

At the same time, the hydraulic fluid of the oil-pressure controlled circuit is heavily stressed, with a consequent sudden degradation and the need for an enhanced cooling system, with consequent high energy consumption.

EP2295171A1 discloses a hydraulic switching arrangement, for operating a metal die casting plant, having a pressure intensifier connected to the accumulator, to the piston space of the filling cylinder, and to the tank. A connection of the control valve controlling the outflow of the fluid displaced from the rod space of the filling cylinder is connected via a line to the piston space of the pressure intensifier designed as a working cylinder comprising a piston with a one-sided piston rod.

BRIEF DESCRIPTION OF THE DRAWING

FIG. 1 is a hydraulic diagram of the injection assembly according to the present invention.

DETAILED DESCRIPTION OF THE INVENTION

The aim of the present invention is to provide an injection assembly for pressure die casting systems that overcomes the drawbacks of the cited prior art.

Within the scope of this aim, an object of the invention is to provide an injection assembly that prevents the onset of any type of cavitation phenomenon.

Another object of the invention is to provide an injection assembly that is constituted by a reduced number of oil-pressure controlled components with respect to injection assemblies of the traditional type.

Another object is to provide an injection assembly that allows energy saving.

Another object of the present invention is to provide an assembly which, by virtue of its particular constructive characteristics, is capable of giving the greatest assurances of reliability and safety in use.

This aim and these and other objects which will become better apparent hereinafter are achieved by an injection assembly for pressure die casting systems, comprising an injection cylinder adapted to inject liquid metal into a casting cavity, said injection cylinder being actuated by a hydraulic flow of an oil-pressure controlled circuit; said oil-pressure controlled circuit comprising a hydraulic cushion which blocks and releases the flow of said hydraulic fluid in said injection cylinder; said hydraulic cylinder providing a counter pressure of a preset value to control the injection speeds and to prevent cavitation in said injection cylinder; said injection cylinder comprising an injection piston which forms a piston side chamber and an annular chamber; said hydraulic cushion comprising a cylindrical body which contains a stem provided with a piston and moving axially in said cylindrical body; said piston dividing the internal volume of said cylindrical body into a reduced chamber and into a larger chamber; said injection assembly being characterized in that said cylindrical body of said hydraulic cushion comprises a resting surface opposed to said stem; said resting surface being smaller than the surface of said stem.

Further characteristics and advantages will become better apparent from the description of preferred but not exclusive embodiments of the invention, illustrated by way of non-limiting example in the accompanying drawing, wherein FIG. 1 is a hydraulic diagram of the injection assembly according to the present invention.

With reference to the cited FIG. 1, the injection assembly according to the invention, generally designated by the reference numeral 1, includes an injection cylinder 19 adapted to inject the liquid metal into a die 21.

According to the present invention, the oil-pressure controlled circuit has only one control valve 22, which is inserted in input between an accumulator 20 and the injection cylinder 19 and controls the entire profile of the injection process.

The hydraulic fluid that is required to move the injection cylinder 19 is drawn from the accumulator 20 and, by means of the control valve 22 and a check valve 2, is introduced in a chamber on the piston side 4 of the injection cylinder 19.

The accumulator 20 is charged with hydraulic fluid at a given pressure.

The injection cylinder 19 is also provided with an annular chamber 5 which is connected to the accumulator 20 by means of ducts 15, 6 and 18. A check valve 7 is provided in the duct 6.

According to the present invention, the oil-pressure controlled circuit has a hydraulic cushion 13 which is constituted by a cylindrical body containing a stem 8 provided with a piston 11 which moves axially in the cylindrical body.

The piston 11 divides the internal volume of the cylindrical body into a reduced chamber 10 and a larger chamber 12.

A duct 16 of the hydraulic cushion 13 connects the reduced chamber 10 to the duct 15 and to a duct 17 connected to a tank 23 by means of an insertion valve 14.

The opposed resting surface 9 can hermetically close the inlet of the duct 16 in the reduced chamber 10 because the opposed resting surface 9 of the cylindrical body of the hydraulic cushion 13 is smaller than the surface of the stem 8.

The resting surface 9 of the hydraulic cushion 13 is 35% smaller than the stem 8 of the hydraulic cushion 13.

The hydraulic cushion 13 is also connected to the accumulator 20 by means of the duct 18.

The injection operation of a pressure die casting machine provided with the injection assembly according to the present invention includes the following steps.

In a first step, there is a slow movement of the injection cylinder 19 in order to compress the molten metal inside the container up to entry into the casting cavity of die 21 and the simultaneous closure of the hole that is present in the container for loading the molten metal, which is not visible in the figure.

The injection speed in the first step is, by way of example, from 0.02 to 0.80 m/s.

The hydraulic fluid that is needed to move the injection cylinder 19 is drawn from the accumulator 20 and, by means of the control valve 22 and the check valve 2, is introduced in the piston side chamber 4 of the injection cylinder 19. The accumulator 20 is loaded beforehand with hydraulic fluid at a given pressure.

The hydraulic fluid that is present in the annular chamber 5 of the injection cylinder 19 is pushed out following the movement of the first step and is inserted in the accumulator 20, through the ducts 15 and 6, the check valve 7 and the duct 18.

During this step, the hydraulic cushion 13 remains in its initial position and the inlet of the duct 16 to the hydraulic cushion is closed hermetically (blocked), since the resting surface 9 of the hydraulic cushion 13 is 35% smaller than the stem 8 of the hydraulic cushion.

During the first step, there is always the same pressure in the ducts 16 and 18. These conditions ensure a 55% greater force with which the piston 11 is pushed against the duct 16 through the surface 9, thus closing the passage hermetically.

At the same time, the reduced chamber 10 of the hydraulic cushion 13 is connected by means of the insertion valve 14 directly to the tank 23 and therefore without pressure.

In a second step, the molten metal is pushed at high speed and with limited force into the cavity of the die 21 with the movement of the injection piston 3.

The duration of the second step is variable between 40 and 80 milliseconds and the range of injection rates is between 2 and 10 m/s, by way of example.

The higher speed in the second step is obtained by further opening the control valve 22.

The valve 22 is sized so as to be able to control the amount of hydraulic fluid both in the first step and in the second step.

Also during the second step, the fluid necessary to move the injection cylinder is drawn from the accumulator 20 and, through the control valve 22 and the check valve 2, is introduced in the programmed quantity into the piston side chamber 4 of the injection cylinder 19.

The hydraulic fluid that is present in the annular chamber 5 of the injection cylinder 19 is pushed outward by the movement of the second step and, through the ducts 15 and 16, is inserted in the chamber 10 of the hydraulic cushion 13.

In order to obtain the opening of the passage of the resting section 9, with the beginning of the second step, the quick-response insertion valve 14 also is energized and switched into position B.

In a very short time, the connection of the reduced chamber 10 of the hydraulic cushion 13 to the tank is thus interrupted, at the same time connecting the duct 17 to the reduced chamber 10 of the hydraulic cushion 13, thus obtaining the same pressure in the reduced chamber 10 as in the ducts 16 and 17.

In this manner a surface is activated that is four times larger than the stem 8 of the hydraulic cushion and the piston 11 of the hydraulic cushion 13 allows to deposit the hydraulic fluid, that is entering through the ducts 16 and 17, inside the chamber 10.

At the same time, the hydraulic fluid generated by the movement of the stem 8 of the hydraulic cushion 13, with constant pressure, is discharged through the duct 18 into the accumulator 20.

As a consequence of the active surface of the hydraulic cushion 13 being increased fourfold, the pressure required in the ducts 15, 16, 17 and in the annular chamber 5 of the injection cylinder 19 is reduced to just 25% with respect to the pressure of the first step and this pressure remains constant throughout the second step. In this manner, the force required to fill the die 21 with the molten metal by the injection cylinder 19 is ensured.

When the die 21 is filled with the molten metal, in a few milliseconds the injection rate is reduced to zero due to the impact.

If desired, the system according to the present invention may also allow an early speed reduction (brake) in order to obtain a less violent impact.

In all cases, the absence of cavitation inside the annular section 5 the injection cylinder 19 is ensured, by means of the hydraulic cushion 13 and of the consequent pressure that is reduced by 25% with respect to the line pressure.

The column of hydraulic fluid that is present in the annular chamber 5 of the injection cylinder 19 and in the ducts 15, 16, 17 does not split and remains with a positive pressure that is equal to 25% of the line pressure.

The third step of the method includes the time for cooling the cast piece: simultaneously with the beginning of this third step, the control valve 22 is switched to the closed position and the insertion valve 14 is moved to the initial position A, thus achieving the connection, during the cooling time, of the annular chamber 5 of the injection cylinder 19 and of the reduced chamber 10 of the hydraulic cushion 13 to the line for discharge to the tank 23 and consequently the reduction of the pressure to zero.

The line pressure that is present in the accumulator 20 and on the stem 8 of the hydraulic cushion 13 pushes the piston 11 of the hydraulic cushion 13 into its initial position, closing again the inlet of the duct 16 towards the reduced chamber 10 of the hydraulic cushion 13.

With the movement of the piston 11 toward the initial position, the hydraulic fluid that is present in the reduced chamber 10, and which had been deposited during the movement of the second step, is discharged into the tank 23 through the insertion valve 14.

The fourth step of the method includes the expulsion of the sprue: the control valve 22 is switched to open, with a low control value, and the piston 3 of the injection cylinder 19 moves forward again at low speed with consequent expulsion of the sprue.

With the beginning of the expulsion of the sprue, the insertion valve 14 is switched to the position B so that the hydraulic fluid that is present in the annular chamber 5 of the injection cylinder 19 is pushed outward by the movement of the cylinder through the ducts 15 and 16 and accumulated in the reduced chamber 10 of the hydraulic cushion 13.

At the end of the movement for the expulsion of the sprue, the control valve 22 is again switched to the closed position, thus obtaining a precise stop of the injection piston 3.

At the same time, the insertion valve 14 is switched to the position A and the reduced chamber 10 is thus again connected to the discharge line, i.e., to the tank 23.

The pressure that is present in the accumulator 20 and consequently also on the stem 8 of the hydraulic cushion 13 pushes the piston 11 backward into its initial position.

The hydraulic fluid in the reduced chamber 10 is discharged into the tank, and at the end of the movement, again closes hermetically the inlet of the duct 16.

The reduced chamber 10 of the piston 11 is again connected to the discharge line and is consequently at zero pressure.

The fifth step of the method is constituted by the return of the injection piston 3: at the end of the automatic cycle, the injection piston 3 is moved backward into its initial position.

In practice it has been found that the invention achieves the intended aim and objects, providing an injection assembly for pressure die casting that is improved significantly by virtue of the innovative concept of the hydraulic cushion that includes the blocking/release of the flow of the hydraulic fluid in order to obtain a more effective operation.

The hydraulic cushion also has the function of blocking valve, which can be released with an electric command.

A further advantage of the present invention is constituted by the reduction of the components of the oil-pressure controlled circuit.

The novel injection assembly with hydraulic cushion according to the present invention has been designed to prevent any form of cavitation at the end of injection process and consequently prevent pressure peaks and very high temperatures.

The injection assembly according to the present invention effectively prevents those phenomena which arise when the injection cylinder, after filling the die with the metal with its movement, stops suddenly.

Due to the sudden stop of the injection piston, the column of hydraulic fluid that is pushed outward at high speed from the annular chamber of the injection cylinder breaks up, generating the phenomenon of cavitation with the consequent forming of pressure peaks and very high temperatures (Diesel effect).

In addition to avoiding any form of cavitation by virtue of the presence of the new hydraulic cushion on the annular branch of the injection cylinder, the presence of the hydraulic cushion renders unnecessary the presence of the servo valve for flow rate/speed control of the injection movement, which is normally inserted in the annular branch of the injection cylinder of an assembly of the traditional type.

The cavitation triggered during the step of injection in the annular branch of the injection cylinder compromises the quality of the cast part and often entails machine downtime, and therefore interruption of production, due to the failure of hydraulic components caused by the presence of pressure peaks and high temperatures that form due to cavitation. At the same time, in a traditional machine, the hydraulic fluid is stressed intensely, with a consequent sudden degradation, and requires an improved cooling system in order to cool down with consequent greater energy consumption, which in the case of the invention described herein is reduced drastically.

A further advantage provided by the presence of the hydraulic cushion is constituted by the "reservoir" function during the second step with preset counterpressure and the subsequent expulsion of the sprue with a preset operating pressure.

This counterpressure is very important for correct operation during the two steps. The counterpressure with a preset value allows precise control of the injection speeds and ensures the absence of cavitation in the annular section of the injection cylinder.

This application claims the priority of Italian Patent Application No. 102016000125927, filed on Dec. 13, 2016, the subject matter of which is incorporated herein by reference.

The invention claimed is:

1. An injection assembly for pressure die casting systems, said injection assembly comprising an injection cylinder adapted to inject liquid metal into a casting cavity, said injection cylinder being actuated by a hydraulic flow of an oil-pressure controlled circuit; said injection cylinder comprising an injection piston which forms a piston side chamber and an annular chamber; said oil-pressure controlled circuit comprising a hydraulic cushion which blocks and releases flow of a hydraulic fluid exiting said annular chamber of said injection cylinder; said hydraulic cushion providing a counter pressure, in said annular chamber of said injection cylinder, of a preset value to control injection speeds and to prevent cavitation in said annular chamber of said injection cylinder; said hydraulic cushion comprising a cylindrical body which contains a stem provided with a piston and moving axially in said cylindrical body; said piston comprising a resting surface opposed to said stem; said resting surface being 35% smaller than an opposing surface of said stem; said piston dividing an internal volume of said cylindrical body into a reduced chamber and into a larger chamber; wherein said piston of said hydraulic cushion comprises said resting surface opposed to said stem; and said resting surface being smaller than a surface of said stem and configured to close an inlet of said reduced chamber, wherein said oil-pressure controlled circuit comprises a single control valve which is inserted in input between an accumulator of hydraulic fluid and said injection cylinder; said single control valve controlling a profile of an injection process, the injection assembly comprising a first check valve inserted in said oil-pressure controlled circuit between said single control valve and said injection cylinder, wherein said annular chamber of said injection cylinder is connected to said accumulator by a first duct to a second duct provided with a second check valve, and a third duct.

2. The injection assembly according to claim 1, wherein said oil-pressure controlled circuit comprises a fourth duct of said hydraulic cushion, said fourth duct connecting said reduced chamber to the first duct which is connected to said annular chamber of said injection cylinder and to a tank by an insertion valve; said hydraulic cushion being connected to said accumulator by the third duct.

3. The injection assembly according to claim 1, wherein said stem of said hydraulic cushion hermetically closes an inlet of a duct of said reduced chamber.

4. The injection assembly according to claim 3, wherein said oil-pressure controlled circuit comprises a fourth duct of said hydraulic cushion, said fourth duct connecting said reduced chamber to the first duct which is connected to said annular chamber of said injection cylinder and to a tank by an insertion valve; said hydraulic cushion being connected to said accumulator by the third duct.

* * * * *